US012769010B2

(12) United States Patent
Langer et al.

(10) Patent No.: US 12,769,010 B2
(45) Date of Patent: Oct. 20, 2026

(54) METHOD FOR OPERATING A GNSS-BASED NAVIGATION MODULE DURING A STARTING PHASE

(71) Applicant: Robert Bosch GmbH, Stuttgart (DE)

(72) Inventors: Markus Langer, Sachsenheim (DE); Thomas Speth, Denkendorf (DE); Kosmas Knoedler, Bad Wimpfen (DE); Marco Limberger, Appenweier-Urloffen (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 18/570,894

(22) PCT Filed: May 23, 2022

(86) PCT No.: PCT/EP2022/063913
§ 371 (c)(1),
(2) Date: Dec. 15, 2023

(87) PCT Pub. No.: WO2022/263114
PCT Pub. Date: Dec. 22, 2022

(65) Prior Publication Data

US 2024/0295660 A1 Sep. 5, 2024

(30) Foreign Application Priority Data

Jun. 16, 2021 (DE) .................... 10 2021 206 153.2

(51) Int. Cl.
*G01S 19/05* (2010.01)
*G01S 19/07* (2010.01)

(52) U.S. Cl.
CPC ............. *G01S 19/05* (2013.01); *G01S 19/07* (2013.01)

(58) Field of Classification Search
CPC ................................ G01S 19/05; G01S 19/07
See application file for complete search history.

(56) References Cited

U.S. PATENT DOCUMENTS 6,323,803 B1 11/2001 Jolley et al.
7,701,387 B2 4/2010 Syrjärinne
(Continued)

FOREIGN PATENT DOCUMENTS

CN 107076855 A 8/2017
JP H6-130144 A 5/1994
(Continued)

OTHER PUBLICATIONS

International Search Report corresponding to PCT Application No. PCT/EP2022/063913, mailed Feb. 17, 2023 (German and English language document) (10 pages).

*Primary Examiner* — Nazra Nur Waheed
(74) *Attorney, Agent, or Firm* — Maginot, Moore & Beck LLP

(57) ABSTRACT

A method for operating a GNSS-based navigation module in a vehicle during a starting phase of the vehicle is disclosed. The method includes a) requesting initial GNSS navigation data from an external data source which provides data at a data rate which is greater than a data provision rate of a regular data source of a GNSS system for GNSS navigation data, and receiving the initial GNSS navigation data from this external data source, b) requesting initial GNSS correction data from an external data source which provides data at a data rate which is greater than a data provision rate of a regular data source of a GNSS system for GNSS correction data, and receiving the initial GNSS correction data from this external data source, and c) determining at least one initial output parameter on the basis of the initial GNSS navigation data and the initial GNSS correction data.

12 Claims, 1 Drawing Sheet

(56) References Cited

U.S. PATENT DOCUMENTS

| | | | | |
|---|---|---|---|---|
| 7,907,087 | B2 | 3/2011 | Käppi | |
| 10,393,878 | B2 * | 8/2019 | Zalewski | H04W 4/40 |
| 10,809,388 | B1 * | 10/2020 | Carcanague | G01S 19/49 |
| 2019/0154842 | A1 * | 5/2019 | Adachi | G01C 21/36 |
| 2020/0013281 | A1 * | 1/2020 | Eriksson | G01S 5/0205 |
| 2020/0096649 | A1 * | 3/2020 | Brandl | G01S 19/08 |
| 2021/0263166 | A1 * | 8/2021 | Zheng | G01S 19/396 |

FOREIGN PATENT DOCUMENTS

| | | | |
|---|---|---|---|
| JP | 2003-35763 | A | 2/2003 |
| JP | 2003-506719 | A | 2/2003 |
| JP | 2008-545985 | A | 12/2008 |
| JP | 2011-80900 | A | 4/2011 |
| JP | 2014-173891 | A | 9/2014 |
| JP | 2018-4434 | A | 1/2018 |

* cited by examiner

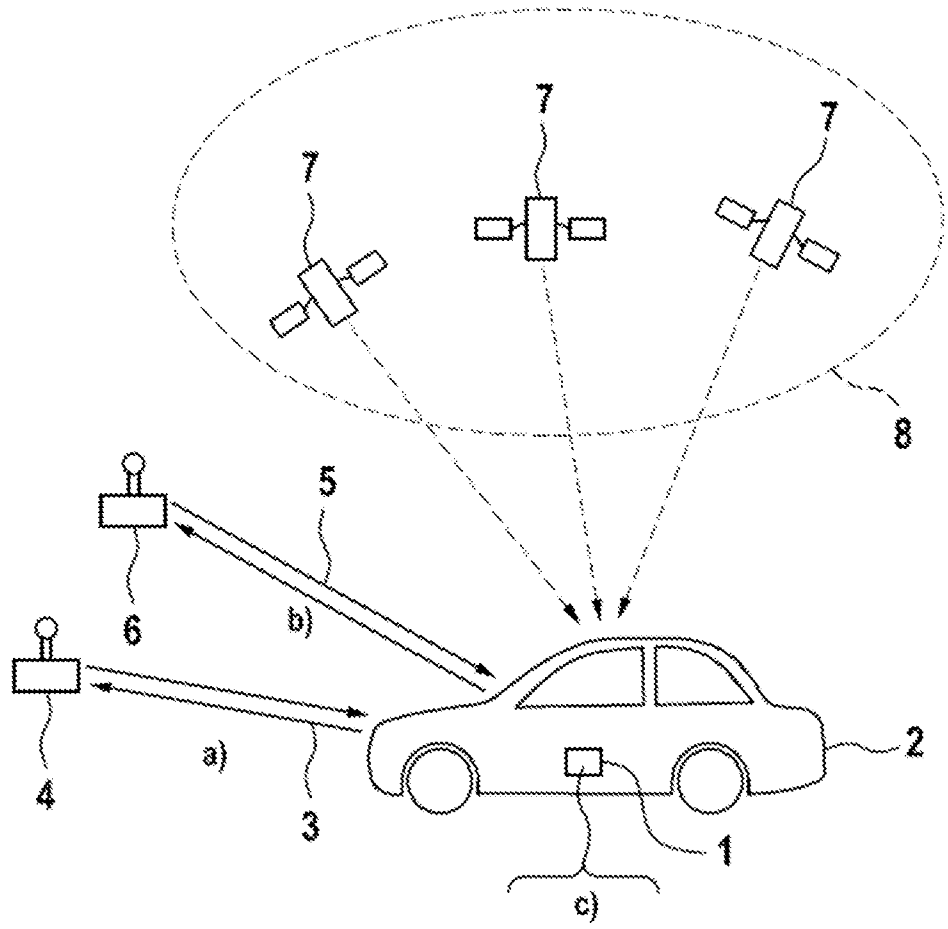
7
7
7
8
5
6
b)
4
a)
3
2
1
c)

METHOD FOR OPERATING A GNSS-BASED NAVIGATION MODULE DURING A STARTING PHASE

This application is a 35 U.S.C. § 371 National Stage Application of PCT/EP2022/063913, filed on May 23, 2022, which claims the benefit of priority to Serial No. DE 10 2021 206 153.2, filed on Jun. 16, 2021 in Germany, the disclosures of which are incorporated herein by reference in their entirety.

The disclosure relates to a method for operating a GNSS-based navigation module during a starting phase, as well as a navigation module configured to perform the method. The disclosure can in particular be used for autonomous driving.

BACKGROUND

To improve the performance of GNSS-based systems for position determination, external data sources are often used to provide information for the position determination via different data channels other than the satellites of the GNSS system or other regular data sources. This is particularly true because such data sources can only continuously transfer the necessary data for the position determination at low bit rates and perform transfer in the form of data packets comprising a variety of information is not possible in a single or a very short chronological interval.

Such approaches are in particular used for the rapid start of GNSS-based systems after an operational interruption and are also referred to as A-GPS (A stands for "assisted"). Navigational information necessary at system start is typically only received via GNSS satellites at very slow data rates.

Data or navigation information required by a navigation module for determining positions can be divided into GNSS navigation data and GNSS correction data. GNSS navigation data are data received directly from satellites in order to perform signal runtime measurements, which can then be used to estimate positions. This refers in particular to code phase information transmitted from satellites in a chronological manner. GNSS correction data are data that can be used to correct errors in the position determination through runtime measurements, e.g., because signal runtimes can be influenced by different conditions. Examples of such faults include, e.g., ionospheric or tropospheric faults, deviations in satellite orbits, etc. The corresponding GNSS correction data are, e.g., referred to as ionospheric data, tropospheric data, or orbit data.

The use of GNSS correction data is common and also necessary for highly precise GNSS-based position determinations.

GNSS correction data can be determined in a variety of ways. One common way of determining GNSS correction data is by calculating errors based on reference measurements in order to then determine appropriate GNSS correction data to correct the observed errors. Another common way to determine GNSS correction data is with the aid of models. These can, e.g., be models of the ionosphere, the troposphere, or the satellite orbits.

GNSS correction data can generally be provided in various formats. The OSR format (Observation State Representation) and SSR format (State Space Representation) should be emphasized. In the OSR format, correction data are transmitted for each individual satellite. In the SSR format, correction data for each individual physical influence on the signal transmission from the satellite to the receiver is transmitted. In the OSR format in particular, the total amount of the GNSS correction data necessary for precise position determination is relatively large. During regular operation of a GNSS system, transferring this total amount of data requires a relatively long period of time. Data in the SSR format are not user-specific. Bidirectional communication for transmitting user-specific information from the user to the data provider in order to be able to provide user-specific data are not required in the case of data in the SSR format. A unidirectional communication channel over which SSR data are usually provided is, e.g., a communication channel based on L band communication signals that can be used by GNSS satellites for data transfer to GNSS receivers. The available bandwidth to provide data over the L band is low.

SUMMARY

Given the foregoing, a particularly advantageous method for operating a GNSS-based navigation module is intended to be described, using which precise position determinations can be made quickly during a starting phase.

A method for operating a GNSS-based navigation module in a vehicle during a starting phase of the vehicle is intended to be described herein, said method comprising the following steps:

a) requesting initial GNSS navigation data from an external data source which provides data at a data rate which is greater than a data provision rate of a regular data source of a GNSS system for GNSS navigation data, and receiving the initial GNSS navigation data from this external data source;
b) requesting initial GNSS correction data from an external data source which provides data at a data rate which is greater than a data provision rate of a regular data source of a GNSS system for GNSS correction data, and receiving the initial GNSS correction data from this external data source;
c) determining at least one initial output parameter on the basis of the initial GNSS navigation data and the initial GNSS correction data.

In this context, GNSS is a global navigation satellite system, e.g. GPS (Global Positioning System) or Galileo. The specified sequence of steps a), b), and c) is by way of example and can be performed in a regular operating sequence of the method or at least once in the specified sequence. Steps a), b), and c), in particular steps a) and b), can furthermore also be performed at least partially in parallel or simultaneously. In particular, steps a), b), and c) can be performed using a navigation module also described herein. The vehicle is preferably a motor vehicle, e.g. an automobile, which is particularly preferably configured for automated or autonomous (driving) operations.

A starting phase in this case in particular refers to a phase shortly after activation or reactivation of the vehicle if the vehicle was previously switched off for a chronological interval. Depending on how long this chronological interval was (e.g., more than half an hour or more than several hours or days), data for the position determination (GNSS correction data or GNSS navigation data) that were received during the last activation of the vehicle are no longer suitable for a high-precision position determination. In particular, GNSS correction data need to be updated very regularly in order to be used for precise position determination.

The vehicle described herein is in particular a passenger vehicle. However, it can be any other vehicle, e.g. a truck, marine vehicle, or aircraft.

The at least one output parameter determined in step c) is in particular a position. A position acting as an output parameter can then preferably also be immediately used in step b) to start a request for position-dependent GNSS correction data. However, it can also be any other possible position parameter, e.g., a position change, a speed of movement, or the like. Preferably, at least one position is determined as an output parameter in step c), and further output parameters are optionally determined.

The method described herein enables a rapid start of high-precision position determinations upon activation of a GNSS-based navigation module. This is achieved by providing a GNSS having both GNSS navigation data and GNSS correction data from external data sources during the starting phase, in which case these data are received by the navigation module at a much higher data rate and therefore during a much shorter period than would be possible during regular operation of the GNSS-based navigation module. For this reason, a highly precise position determination can also be performed much faster.

Particularly preferable is when at least one first request is made in step b) for initial GNSS correction data independent of a position of the vehicle.

It is further advantageous when, prior to step b), a first initial position is determined using the initial navigation data received in step a) and, in step b), a second request is made for initial GNSS correction data that differ depending on a position of the vehicle, whereby the request includes information regarding the first initial position.

For a request for GNSS correction data, it is particularly advantageous if the navigation module knows its ego position at least approximately. Of course, this applies in particular to such GNSS correction data that are position-dependent. Without such information regarding the ego position, position-dependent correction data are only provided after a delay. For this reason, it can be advantageous to determine a first initial position even without the present correction data available, which is then used as the request parameter to request the initial GNSS correction data. However, such a first initial position can optionally also be read out from a memory, in which such a first initial position was stored when the vehicle was last parked.

Once initial correction data have then been received in response to the corresponding request, a second initial position can be determined, whereby initial GNSS navigation data and initial GNSS correction data have already been taken into account, thereby achieving high precision in the position determination.

The improvement achieved using the method described herein is in particular the ability to achieve a high position accuracy even in the starting phase, because it is possible to work with (chronologically) up-to-date GNSS correction data when determining the position, which would not be available in the starting phase without the method described herein.

In addition, it is advantageous for the GNSS correction data requested and received in step b) to include integrity information that defines the integrity of the GNSS correction data. Preferably, the GNSS navigation data received in step a) also include integrity information defining the integrity of the GNSS navigation data.

Such integrity information is used to determine the integrity of the determined output parameter and in particular the determined position when determining output parameters (in particular when determining the position). The integrity of the determined position is in particular partial information that is part of the position determined in step c). The integrity of the determined position can be further processed by further components in the vehicle along with the position. In step c), an integrity of the initial output parameters is in particular also determined as part of the initial output parameter. Integrity information is particularly important when using determined output parameters as parameters for autonomous driving and driver assistance system applications. This applies in particular if the at least one initial output parameter is an (initial) position.

A further acceleration in the performance of high-precision position determinations during a starting phase can be achieved by performing steps a) and b) in parallel. In step b), only GNSS correction data are requested and received that are independent of the position and, based on the initial GNSS navigation data and the initial GNSS correction data, only these position-independent data are referred back to in order to determine the initial position during step c). When performing steps a) and b) at the same time, it is important that these steps do not build upon one another.

A further acceleration in the performance of high-precision position determinations can be achieved if the initial position in step c), the initial GNSS navigation data, and/or the initial GNSS correction data are read at least in part from a memory. However, such access to a memory is in any case supplemented by access to an external data source according to the method described herein. This applies in particular if the information stored in the memory (whether initial position, GNSS navigation data or initial GNSS correction data) is older. The initial position is optionally determined in step c) as a result of a weighted migration of data stored in memory obtained during a previous operation of the vehicle, as well as GNSS correction data and GNSS navigation data received from external data sources or initial positions determined based on such data during steps a) and b).

With regard to GNSS correction data in particular, there is the problem that they become obsolete over time. For this reason, GNSS correction data collected, recorded, and stored in memory during a preceding operational phase of a vehicle can generally no longer be used for position determination if the vehicle was parked or deactivated for an extended period of time after the preceding operational phase.

In addition, the method is preferred if initial GNSS correction data are received as a data packet in step b), which enables initialization of the at least one correction algorithm in the navigation module.

Preferably, such a data packet contains in particular GNSS correction data in SSR format. Such data preferably have a position-independent validity, which in extreme cases can be global. Position-independent validity in this case also includes when the data are position-independent in a locally limited area/region. For example, a data packet of GNSS correction data can exist for the whole of Europe or the whole of Germany or a similar region. Regarding the request of such a data packet of GNSS correction data in step b), information about the respective region is preferably permanently stored or a flag is transferred during the request for which region the data packet of GNSS correction data are intended to be received. A complete set of such GNSS correction data is thus received from the external data source in step b). The navigation module can then be configured using this set of GNSS correction data. Such SSR correction data arrive only slowly or are distributed over a longer period of time during regular operation of the navigation module. The provision of such correction data directly at the start of operation of the navigation module as a data packet makes it possible to precisely determine output parameters (in particular positions) much faster.

In the context of the described method, it is particularly advantageous if the external data sources used in step a) and/or b) are external to a part of a satellite navigation system stationed in an orbit.

Particularly preferred is when the external data sources used in step a) and/or b) are stationed on the ground.

It is also advantageous if the external data sources used in step a) and/or b) are mobile communications data sources.

Through such external data sources, the GNSS correction data and/or the GNSS navigation data can be received very quickly in the starting phase, in particular because such data sources are available very quickly after starting.

As already described, the method is configured for the starting phase of operation of a navigation module. Preferably, the system is switched to a regular operating mode, in which GNSS navigation data and/or GNSS correction data are received from satellites of a satellite navigation system, following step a) to c).

GNSS navigation data are usually or preferably received entirely or exclusively via the satellites of the satellite navigation system in regular operation. GNSS correction data, on the other hand, can also be received in part in regular operation from data sources other than satellites, e.g., via correction data services that continuously provide a data stream of correction data.

In addition, it is preferred if, during steps a) to c), it is monitored whether GNSS navigation data of a quality above a threshold quality can be received via satellites of a satellite navigation system, and, if this is the case, GNSS navigation data received via satellites is used to determine positions.

In addition, it is preferred if, during steps a) to c), it is monitored whether GNSS correction data of a specified quality above a threshold quality can be received via satellites of a satellite navigation system, and, if this is the case, GNSS correction data received via satellites is used to determine positions.

This procedure relates in particular to SSR data as GNSS correction data or as initial GNSS correction data received in step b). Preferably, the threshold quality is a specified quality selected so that this quality is (usually) higher than the quality of the initial GNSS correction data received in step b). The GNSS navigation module then switches the correction data used from the initial GNSS correction data to the GNSS correction data received via satellites. In a further embodiment of the described method, the GNSS navigation data and/or GNSS correction data received from the external data sources in steps a) and b) are compared with data received later (in the regular operating mode) from regular data sources (in particular from satellites). As a result, a validation of the data quality and in particular a quality of the data transmission of the GNSS navigation data and/or the GNSS correction data are preferably performed.

According to a further aspect, a computer program for performing a method described herein can also be provided. In other words, this aspect relates in particular to a computer program (product) comprising instructions which, when the program is executed by a computer, cause the latter to perform a method described herein. Furthermore, a machine-readable storage medium on which the computer program is stored can also be provided. Conventionally, the machine-readable storage medium is a computer-readable data medium.

Also intended to be described herein is a navigation module configured to perform the method described. The navigation module is in particular one for a vehicle, in particular it can be arranged in or on a vehicle and/or be connected to electronic control devices of the vehicle. For example, the storage medium described hereinabove can be part of the navigation module or connected to it. Preferably, the navigation module is a GNSS sensor. The navigation module is further preferably provided and configured for autonomous operation of the vehicle. Furthermore, the navigation module can be a combined movement and position sensor. Such a sensor is particularly advantageous for autonomous vehicles. The navigation module or a computing unit (processor) of the navigation module can, e.g., access the computer program described herein in order to perform a method described herein.

The details, features, and advantageous embodiments explained in connection with the method can also occur in the computer program presented herein and/or in the storage medium, and/or in the navigation module, and vice versa. In this respect, reference is made in full to the explanations made in the relevant passage regarding a more detailed characterization of the features.

BRIEF DESCRIPTION OF THE DRAWINGS

The method, the navigation module, and the technical environment are explained in greater detail below with reference to the drawing. The drawing shows a particular exemplary embodiment, to which the disclosure is not limited. Shown is:

FIG. 1: a sketch of the described method.

DETAILED DESCRIPTION

FIG. 1 shows a vehicle 2 (e.g., a passenger vehicle) comprising a navigation module 1, which is configured to determine a position of the vehicle 2 based on signals from GNSS satellites 7 of a satellite navigation system 8. However, during a starting phase, the position determination module 1 receives initial GNSS navigation data 3 from a first external data source 4 and initial GNSS correction data 5 from a second external data source 6 and not from the satellites 7 of the satellite navigation system 1. This occurs according to the method steps a) and b). In step c), the position determination is then based on these data. After the end of the starting phase (in regular operation), the initial GNSS navigation data 3 and the initial GNSS correction data 5 are then substituted by regularly received (preferably via satellite) GNSS navigation data 3 and GNSS correction data 5.

The invention claimed is:

1. A method for operating a GNSS-based navigation module in a vehicle during a starting phase of the vehicle, comprising:

a) requesting initial GNSS navigation data from an external data source which provides GNSS navigation data at a data rate which is greater than a data provision rate of a regular data source of a GNSS system for GNSS navigation data, and receiving the initial GNSS navigation data from this external data source;

b) requesting initial GNSS correction data from an external data source which provides GNSS correction data at a data rate which is greater than a data provision rate of a regular data source of a GNSS system for GNSS correction data, and receiving the initial GNSS correction data from this external data source; and c) determining at least one initial output parameter based on the initial GNSS navigation data and the initial GNSS correction data, the determining including using the initial GNSS navigation data to perform signal runtime measurements and using the initial GNSS correction data to correct errors in the signal runtime measurements.

2. The method according to claim 1, wherein at least one first request is made in step b) for initial GNSS correction data which are independent of a position of the vehicle.

3. The method according to claim 1, wherein:

prior to step b), a first preliminary position is determined using the initial navigation data received in step a), in step b), a second request is made for initial GNSS correction data that differ depending on a position of the vehicle, and the request includes information regarding the first initial position.

4. The method according to claim 1, wherein the GNSS correction data requested and received in step b) include integrity information that defines the integrity of the GNSS correction data.

5. The method according to claim 1, wherein:

in step b), initial GNSS correction data are received as a data packet which enables initialization of at least one correction algorithm in the navigation module.

6. The method according to claim 1, wherein the external data sources used in step a) and/or step b) are external to a portion of a satellite navigation system stationed in orbit.

7. The method according to claim 6, wherein the external data sources used in step a) and/or step b) are stationed on a ground.

8. The method according to claim 6, wherein the external data sources used in step a) and/or step b) are mobile communications data sources.

9. The method according to claim 8, wherein:

during steps a) to c), monitoring whether GNSS correction data of a specified quality above a threshold quality can be received via satellites of a satellite navigation system and, in response to the GNSS correction data of the specified quality above the threshold quality being received, using GNSS correction data received via satellites to determine positions.

10. The method according to claim 1, further comprising:

after steps a) to c), switching the system to a regular operating mode in which GNSS navigation data and/or GNSS correction data are received from satellites of a satellite navigation system.

11. The method according to claim 10, further comprising:

during steps a) to c), monitoring whether GNSS navigation data of a specified quality above a threshold quality can be received via satellites of a satellite navigation system and, in response to the GNSS navigation data of the specified quality above the threshold quality being received, using GNSS navigation data received via satellites to determine positions.

12. A navigation module configured to perform the method according to claim 1.

* * * * *